United States Patent
Zhu et al.

(10) Patent No.: US 11,912,893 B2
(45) Date of Patent: Feb. 27, 2024

(54) TIRE ANTI-TARNISH PROTECTIVE SOLUTION AND PREPARATION METHOD THEREOF

(71) Applicants: QINGDAO UNIVERSITY, Qingdao (CN); QINGDAO CHUANGZHIHENGYE NEW MATERIAL CO., LTD, Qingdao (CN); OTSUKA MATERIAL SCIENCE AND TECHNOLOGY (SHANGHAI) CO., LTD., Shanghai (CN)

(72) Inventors: Guangmiao Zhu, Qingdao (CN); Yanzhen Li, Qingdao (CN); Jionghao He, Shanghai (CN); Yue Li, Qingdao (CN); Fangwei Hou, Qingdao (CN); Yanlei Li, Shanghai (CN)

(73) Assignees: QINGDAO UNIVERSITY, Qingdao (CN); QINGDAO CHUANGZHIHENGYE NEW MATERIALS CO., LTD, Qingdao (CN); OTSUKA MATERIAL SCIENCE AND TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/266,609

(22) PCT Filed: Dec. 6, 2022

(86) PCT No.: PCT/CN2022/136714
§ 371 (c)(1),
(2) Date: Jun. 12, 2023

(87) PCT Pub. No.: WO2023/078469
PCT Pub. Date: May 11, 2023

(65) Prior Publication Data
US 2023/0392023 A1 Dec. 7, 2023

(30) Foreign Application Priority Data
Dec. 16, 2021 (CN) .......................... 202111544482.3

(51) Int. Cl.
*C09D 7/43* (2018.01)
*C09D 7/48* (2018.01)
*C09D 7/65* (2018.01)
*C09D 7/80* (2018.01)
*C09D 5/02* (2006.01)
*C09D 7/61* (2018.01)
*C09D 7/63* (2018.01)
*C09D 163/00* (2006.01)

(52) U.S. Cl.
CPC ............... *C09D 5/024* (2013.01); *C09D 7/48* (2018.01); *C09D 7/61* (2018.01); *C09D 7/63* (2018.01); *C09D 7/65* (2018.01); *C09D 7/80* (2018.01); *C09D 163/00* (2013.01)

(58) Field of Classification Search
CPC ... C09D 4/06; C09D 7/61; C09D 7/63; C09D 7/43; C09D 7/48; C09D 7/65
See application file for complete search history.

(56) References Cited

U.S. PATENT DOCUMENTS

| | | | |
|---|---|---|---|
| 5,371,136 A | 12/1994 | Brooks et al. | |
| 5,837,076 A | 11/1998 | Huber et al. | |
| 2012/0082791 A1 | 4/2012 | Liversage | |
| 2014/0348776 A1* | 11/2014 | Palmer, Jr. ............... | C08K 3/20 428/35.8 |
| 2020/0208002 A1* | 7/2020 | Guo ..................... | C04B 40/065 |
| 2021/0095158 A1* | 4/2021 | Chen ....................... | C09D 7/63 |
| 2021/0395534 A1* | 12/2021 | Cousino ................. | C09D 5/022 |
| 2022/0134602 A1* | 5/2022 | Schmaunz-Hirsch ..................... | D06M 11/47 264/134 |

FOREIGN PATENT DOCUMENTS

| | | | | |
|---|---|---|---|---|
| CN | 1760291 A | * | 4/2006 | |
| CN | 105176378 A | * | 12/2015 | |
| CN | 107118656 A | | 9/2017 | |
| CN | 108753049 A | * | 11/2018 | ........... C09D 107/02 |
| CN | 111205708 A | | 5/2020 | |
| CN | 114106606 A | | 3/2022 | |
| JP | 2012176682 A | | 9/2012 | |

OTHER PUBLICATIONS

Machine translation of Zhu et al. (CN114106606A), publication date Mar. 1, 2022.*
Machine translation of Chen (CN108753049A), publication date Nov. 6, 2018.*

* cited by examiner

*Primary Examiner* — Jun Li
(74) *Attorney, Agent, or Firm* — Bayramoglu Law Offices LLC

(57) ABSTRACT

A tire anti-tarnish protective solution and a preparation method thereof are provided. The preparation method includes: mixing 15 to 25 parts of a waterborne epoxy resin, 20 to 35 parts of a toughening waterborne resin, 0.5 to 2.5 parts of a modifier, 1 to 2 parts of a reactive ultraviolet (UV) absorber, 1 to 3.5 parts of an active agent, 2.6 to 5.5 parts of a film-forming additive and other additives, 0 to 6 parts of a pigment/filler, 0.05 to 0.2 part of a bactericide, and 40 to 60 parts of deionized water, adding 0.4 to 1.6 parts of a curing additive, 0.05 to 0.5 part of a stabilizer, and 0.1 to 0.8 part of a thickener under stirring, stirring a resulting mixture for a specified time, and filtering a resulting system to obtain the protective solution.

14 Claims, 1 Drawing Sheet

TIRE ANTI-TARNISH PROTECTIVE SOLUTION AND PREPARATION METHOD THEREOF

CROSS REFERENCE TO THE RELATED APPLICATIONS

This application is the national phase entry of International Application No. PCT/CN2022/136714, filed on Dec. 6, 2022, which is based upon and claims priority to Chinese Patent Application No. 202111544482.3, filed on Dec. 16, 2021, the entire contents of which are incorporated herein by reference.

TECHNICAL FIELD

The present disclosure relates to the technical field of tire additives, and specifically relates to a tire anti-tarnish protective solution and a preparation method thereof.

BACKGROUND

Currently, during storage and transportation, produced finished tires are prone to tarnish due to factors such as tire storage environment, storage time, and tire formula, which affect the normal sale of the tires. The above problem is usually solved through modification with a tire masking solution. However, tire masking or protective solutions on the market are simple protective wax/carbon black pigment systems or crosslinking-free curing systems, which are easily wiped off, can only temporarily cover a tarnished part of the tire, can easily be rubbed off during delivery and transportation, and cannot play a prominent role in tire anti-tarnish. For example, CN111205708A discloses a protective solution for a white tire sidewall, which is free of a crosslinking-curing system and can be cleaned away with clean water in a late stage. Therefore, the development of a protective solution that can form a dense coating layer with a crosslinking-curing effect on a sidewall of a tire to provide excellent permanent or semi-permanent protection for the tire is of great significance for the improvement of the quality and service life of the tire.

SUMMARY

In view of the above deficiencies of the prior art, the inventors have designed and developed a tire anti-tarnish protective solution and a preparation method thereof through long-term practice. The tire anti-tarnish protective solution is environmentally-friendly and easy to use.

The present disclosure is implemented by the following technical solutions.

The present disclosure provides a tire anti-tarnish protective solution prepared from the following components in parts by weight:

| | |
|---|---|
| film-forming additive | 0.5 to 2 |
| defoaming agent | 0.1 to 0.5 |
| dispersing agent | 2 to 3 |
| waterborne epoxy resin | 15 to 25 |
| toughening waterborne resin | 20 to 35 |
| modifier | 0.5 to 2.5 |
| active agent | 1 to 3.5 |
| reactive ultraviolet (UV) absorber | 1 to 2 |
| pigment/filler | 0 to 6 |
| bactericide | 0.05 to 0.2 |
| curing additive | 0.4 to 1.6 |
| stabilizer | 0.05 to 0.5 |
| thickener | 0.1 to 0.8 |
| deionized water | the balance, | where the above components are in 85 to 150 parts by weight in total.

Further, the film-forming additive is one or more selected from the group consisting of propylene glycol butyl ether, propylene glycol monomethyl ether acetate (PGMEA), and 2,2,4-trim ethyl-1,3-pentanediol monoisobutyrate (TMPD-MIB).

Further, the waterborne epoxy resin is a dispersion or system of a polymer waterborne epoxy resin that partially includes hydroxyl, and is preferably a one-component epoxy resin emulsion EPICLON H-502-42W.

Further, the toughening waterborne resin is a C/C double bond-containing waterborne emulsion, is preferably one or more selected from the group consisting of a natural latex, a waterborne isoprene rubber emulsion, a waterborne butadiene-styrene latex, a waterborne acrylic latex, and a waterborne polyurethane (WPU) latex, and is more preferably a WPU latex or a waterborne butadiene-styrene latex SD-7946.

Further, the modifier is an acylhydrazone compound or an oligomer, and is preferably a diacylhydrazone compound.

Further, the active agent is a transition metal oxide, and is preferably ZnO.

Further, the reactive UV absorber is a compound carrying a UV-absorbing group, and is preferably 2-[3-(2H-benzotriazol-2-yl)-4-hydroxyphenyl]ethyl 2-methacrylate.

Further, the curing additive is a dispersible isocyanate, and is preferably a water-dispersible polyisocyanate resin BURNOCK DNW-5500.

The present disclosure also provides a preparation method of the tire anti-tarnish protective solution, including the following steps:

S1. adding the deionized water to a reaction vessel, adding the film-forming additive, the defoaming agent, the dispersing agent, the waterborne resins, the modifier, the active agent, the reactive UV absorber, the pigment/filler, and the bactericide successively, and stirring a resulting emulsion at a rotational speed of 450 rpm to 650 rpm; and S2. diluting the dispersible curing additive with a specified amount of deionized water, and under stirring at a same rotational speed, adding a resulting dilution dropwise to an emulsion system obtained after thorough stirring in S1; and adding the stabilizer and the thickener successively, stirring a resulting mixture for a specified time, and filtering a resulting system to obtain the protective solution.

Further, in S2, the stirring is conducted for 30 min to 60 min.

Compared with the prior art, the present disclosure has the following beneficial effects:

The present disclosure adopts a high-molecular-weight waterborne epoxy resin/toughening resin/curing additive system, which can be quickly dried at room temperature to form a ductile film with a specified deformation amount, and can prevent the coating layer from falling off during dynamic deformation of a tire. In addition, the curing additive can react with hydroxyl on the epoxy resin to further improve the adhesion of a coating layer on a tire, and experimental results show that an amount of the curing additive can be changed to effectively shorten a surface drying time of a coating layer. The introduced modifier complexes with a transition metal oxide such as zinc oxide to form coordinate bonds interspersed among resin molecular chains, and the coordinate bonds can enhance an intermolecular interaction and improve the damage resistance and weather resistance of the resin molecular chains themselves. The reactive UV absorber is subjected to an addition reaction with a C/C double bond of the toughening waterborne resin, such that a UV-absorbing group is introduced into the toughening waterborne resin to improve the UV resistance of the final protective solution. After being sprayed on a sidewall of a tire, the protective solution of the present disclosure can form a dense coating layer on the sidewall of the tire. The system of the present disclosure can lead to a coating film that can be cured at room temperature, has excellent adhesion and super-strong weather resistance, and can provide excellent permanent or semi-permanent protection for both black tires and color tires. In addition, a tire surface sprayed with the protective solution of the present disclosure is not greasy and retains smooth appearance, and the protective solution does not cause corrosion to a tire and can improve the performance and service life of a tire.

DETAILED DESCRIPTION OF THE EMBODIMENTS

Figure 1:
FIG. 1 is a contrast schematic diagram of a surface of a tire that is partially coated with the protective solution of the present disclosure for 3 weeks.

To make the objectives and technical solutions of the present disclosure clear, the present disclosure is further described in detail below with reference to embodiments.

The present disclosure provides a tire anti-tarnish protective solution prepared from the following components in parts by weight: a film-forming additive: 0.5 to 2 parts; a defoaming agent: 0.1 to 0.5 part; a dispersing agent: 2 to 3 parts; a waterborne epoxy resin: 15 to 25 parts; a toughening waterborne resin: 20 to 35 parts; a modifier: 0.5 to 2.5 parts; an active agent: 1 to 3.5 parts; a reactive UV absorber: 1 to 2 parts; a pigment/filler: 0 to 6 parts; a bactericide: 0.05 to 0.2 parts; a curing additive: 0.4 to 1.6 parts; a stabilizer: 0.05 to 0.5 part; a thickener: 0.1 to 0.8 part; and deionized water: the balance, where the above components are in 85 to 150 parts by weight in total.

The above components each are preferably as follows: The film-forming additive is at least one selected from the group consisting of propylene glycol butyl ether, PGMEA, and TMPD-MIB.

The defoaming agent is at least one selected from the group consisting of Foamex 1488, FoamStar ST2410AC, and AGITAN760 defoaming agents.

The dispersing agent is at least one selected from the group consisting of fatty acids, fatty alcohols, aliphatic amides, and esters.

The waterborne epoxy resin is a dispersion or system of a polymer waterborne epoxy resin that partially includes hydroxyl, and is preferably a one-component epoxy resin emulsion EPICLON H-502-42W.

The toughening waterborne resin is one or more selected from the group consisting of a natural latex, a waterborne isoprene rubber emulsion, a waterborne butadiene-styrene latex, a waterborne acrylic latex, a WPU latex, and another C/C double bond-containing waterborne emulsion with an excellent toughening effect, and is preferably a WPU latex or a waterborne butadiene-styrene latex SD-7946.

The active agent is a transition metal oxide, and is preferably ZnO.

The modifier is an acylhydrazone compound or an oligomer, and is preferably a diacylhydrazone compound. The introduced modifier complexes with a transition metal oxide such as zinc oxide to form coordinate bonds interspersed among resin molecular chains, and the coordinate bonds can enhance an intermolecular interaction and improve the damage resistance and weather resistance of the resin molecular chains themselves.

The reactive UV absorber is a compound carrying a UV-absorbing group, and is preferably 2-[3-(2H-benzotriazol-2-yl)-4-hydroxyphenyl]ethyl 2-methacrylate. The reactive UV absorber is subjected to an addition reaction with a C/C double bond of the toughening waterborne resin, such that a UV-absorbing group is introduced into the toughening waterborne resin to improve the UV resistance of the final protective solution.

The pigment/filler is at least one selected from the group consisting of nano zinc oxide, titanium dioxide, lithopone, pigment carbon black, and white carbon black.

The curing additive is a dispersible isocyanate, and is preferably a water-dispersible polyisocyanate resin BURNOCK DNW-5500. An isocyanate group of the curing additive can react with a small amount of hydroxyl in the epoxy resin H-502-42W to accelerate the film formation of the epoxy resin, accelerate the curing, and shorten the surface drying time.

The bactericide is at least one selected from the group consisting of copper oxide, monoammonium phosphate (MAP), anilide, imidazole, thiazole, isothiazolone derivatives, quaternary ammonium salts, biguanides, and phenol.

The stabilizer is at least one selected from the group consisting of organic amines, ammonia water, and sodium hydroxide.

The thickener is at least one selected from the group consisting of carboxymethylcellulose (CMC), propylene glycol alginate, methyl cellulose (MC), sodium starch phosphate, sodium carboxymethyl cellulose (Na-CMC), sodium alginate, casein, sodium polyacrylate, polyoxyethylene, polyvinylpyrrolidone (PVP), and other non-ionic polyurethane (PU) polymers.

The present disclosure also provides a preparation method of the tire anti-tarnish protective solution, including the following steps:

S1. the deionized water is added to a reaction vessel in advance, the film-forming additive, the defoaming agent, the dispersing agent, the waterborne resins, the modifier, the active agent, the reactive UV absorber, the pigment/filler, and the bactericide are added successively, and a resulting emulsion is stirred at a rotational speed of 450 rpm to 650 rpm; and S2. the curing additive is diluted with a specified amount of deionized water, and under stirring at a same rotational speed, a resulting dilution is added dropwise to an emulsion system obtained after thorough stirring in S1; and the stabilizer and the thickener are added successively, and a resulting mixture is stirred for 30 min to 60 min and then filtered to obtain the protective solution.

The above feeding order is adopted to achieve the following purpose: The early addition of the film-forming additive, defoaming agent, dispersing agent, or the like is conducive to providing a stable dispersion environment for film-forming substances, such that the film-forming substances can be uniformly and stably dispersed, which is conducive to the uniformity of film formation and can effectively improve the stability of the coating. The curing additive is diluted with deionized water and then added dropwise, which can ensure the uniform dispersion of the curing additive. When the stirring is conducted at a rotational speed of 450 rpm to 650 rpm for 30 min to 60 min, a prepared protective solution has an optimal effect. A too-low rotational speed will lead to low efficiency and poor dispersion. A too-high rotational speed and a too-long stirring time will affect the stability of a system and a film-forming quality of the prepared protective solution.

To further describe the present disclosure, the tire anti-tarnish protective solution and the preparation method thereof provided by the present disclosure are described in detail below with reference to specific examples. However, these examples should not be construed as limitations to the protection scope of the present disclosure.

Examples 1 to 5

The components and parts by weight thereof in each of Examples 1 to 5 were shown in Table 1.

table, the film-forming additive, defoaming agent, dispersing agent, waterborne resins, modifier, active agent, reactive UV absorber, pigment/filler (if the pigment/filler was not added, a prominent masking effect could also be achieved), and bactericide were added successively.

S2: A resulting mixture was stirred at a rotational speed of 450 rpm to 650 rpm, the remaining 5 parts by weight of the curing additive diluted with deionized water, the stabilizer, and the thickener were added under stirring, and a resulting mixture was further stirred for 30 min to 60 min and then filtered to obtain a protective solution.

Figure 2:
FIG. 2 is a contrast schematic diagram of a surface of a tire that is partially coated with the protective solution of the present disclosure for 6 months.

According to coating test standards, the prepared protective solution was subjected to performance tests, and test results and corresponding test standards were shown in Table 2. The prepared protective solution was coated on a part of a surface of a tire, the tire was placed for a specified period of time, and then the surface of the tire was observed. As shown in FIG. 1 and FIG. 2, the tire part coated with the protective solution (the left part in FIG. 1 and FIG. 2) did not undergo significant tarnish after the tire was placed for 3 weeks or 6 months, and the tire part not coated with the protective solution (the right part in FIG. 1 and FIG. 2) underwent significant aging and tarnish after the tire was

TABLE 1

Components and parts by weight thereof in corresponding examples

| Component name | Component formula | Example 1 (Parts by weight) | Example 2 (Parts by weight) | Example 3 (Parts by weight) | Example 4 (Parts by weight) | Example 5 (Parts by weight) |
|---|---|---|---|---|---|---|
| Water | Deionized water in S1 | 40 | 45 | 55 | 50 | 60 |
|  | Deionized water in S2 | 5 | 5 | 5 | 5 | 5 |
| Film-forming additive | TMPD-MIB | 0.5 | 1 | 2 | — | — |
|  | Propylene glycol butyl ether | — | — | — | 1.5 | 2 |
| Defoaming agent | Foamex 1488 | 0.1 | 0.25 | 0.5 | — | — |
|  | FoamStar ST2410AC | — | — | — | 0.25 | 0.5 |
| Dispersing agent | CO430/BL240/COPS-1 | 2 | 3 | 3 | — | — |
|  | CO430/SN5040/COPS-1 | — | — | — | 2 | 3 |
| Waterborne epoxy resin | EPICLON H-502-42W | 15 | 18 | 22 | 20 | 25 |
| Toughening waterborne resin | Waterborne butadiene-styrene latex SD-7946 | 20 | 30 | — | — | — |
|  | WPU emulsion | — | — | 32 | 25 | — |
|  | Waterborne acrylic emulsion Bayhydrol A2058 | — | — | — | — | 35 |
| Modifier | Maleimide acylhydrazone derivative | 0.5 | 1.5 | 2.5 | — | — |
|  | Diacylhydrazone derivative | — | — | — | 1 | 2.5 |
| Active agent | ZnO | 1 | 1.5 | 2.5 | 2 | 3 |
| Reactive UV absorber | 2-[3-(2H-benzotriazol-2-yl)-4-hydroxy phenyl]ethyl 2-methacrylate | 1 | 1.5 | 2 | 1.8 | 2 |
| Pigment/filler | Carbon black pigment | 0 | 0 | 5 | 5 | 0 |
| Bactericide | iHeir-PLUS | 0.05 | 0.1 | 0.15 | 0.1 | 0.2 |
| Curing additive | BURNOCK DNW-5500 | 0.4 | 1 | 1.5 | 0.8 | 1.6 |
| Stabilizer | DMEA | 0.05 | 0.25 | 0.5 | 0.15 | 0.45 |
| Thickener | WT-105A | 0.1 | 0.65 | 0.45 | 0.38 | 0.8 |

S1: 40 to 60 parts by weight of deionized water were added to a reactor according to Table 1, and according to parts by weight of each component in the above placed for 3 weeks or 6 months, which affected a quality of the tire. Therefore, it is concluded that the protective solution has a very outstanding anti-tarnish effect.

TABLE 2

Measurement data of the protective solutions prepared in corresponding examples

| Test item | Test standard | Example 1 | Example 2 | Example 3 | Example 4 | Example 5 |
|---|---|---|---|---|---|---|
| Viscosity/mPa · s (rotational viscometer) | GB/T 1723-1993 | 40.56 | 101.27 | 116.46 | 106.35 | 155.25 |
| Solid content/% | GB/T1725-2007 | 20.16 | 21.45 | 22.85 | 21.7 | 22.13 |
| PH | — | 7.65 | 7.82 | 8.26 | 7.72 | 7.98 |
| Surface drying time/h | GB/T1728-79 | 0.5 | <0.5 | <0.5 | 0.5 | <0.5 |
| Stability | GB/T6753.3-1986 | 1 year at room temperature | 1 year at room temperature | 10 months at room temperature | 10 months at room temperature | 7 months at room temperature |
| Weather resistance (artificial aging for 720 h) | GB/T 9276-1996 | No abnormality | No abnormality | No abnormality | No abnormality | No abnormality |
| UV aging resistance (7 d) | GB/T1865-1997 | No blistering and no powdering | No blistering and no powdering | No blistering and no powdering | No blistering and no powdering | No blistering and no powdering |
| Elongation at break/% | HG/T 3849-2008 | ≥400 | ≥400 | ≥400 | ≥400 | ≥400 |
| Adhesion/grade | GB/T 9286-1998 | 1 | 0 | 0 | 1 | 1 |

It can be seen from the above data that the protective solutions obtained in the above 5 examples can meet the requirements of tire protective solutions; after the protective solutions are spray-coated on a tire, a surface drying time at room temperature is less than or equal to 0.5 h, which is mainly achieved by the combination of the polymer waterborne resin and the curing additive (the coating includes a small amount of hydroxyl and a waterborne isocyanate that play a synergic curing role), and the adhesion of a coating layer to the tire is enhanced; the elongation at break ensures that a coating layer does not fall off during deformation of a tire sidewall, which is mainly achieved by the compounding with the toughening waterborne resin; the addition of the modifier essentially improves the aging resistance and damage resistance of the resin; the addition of the reactive UV absorber introduces a UV-absorbing group on a waterborne resin chain, such that the UV aging resistance of a coating layer can be substantially improved; and the stability of the coating can be maintained for 6 months or longer, which meets the industry standards of coatings.

It should be noted that, in the description of the present disclosure, orientation or position relationships indicated by terms such as "vertical", "up", "down", and "horizontal" are orientation or position relationships as shown in the drawings. These terms are merely used to facilitate and simplify the description, rather than to indicate or imply that the mentioned apparatus or elements must have a specific orientation and must be established and operated in a specific orientation. Therefore, these terms should not be understood as a limitation of the present disclosure.

In the description of the present disclosure, it should be noted that, unless otherwise clearly specified and defined, the terms "arrange", "install", "connected with", "connected to", and "communicate with" should be understood in a board sense. For example, the connection may be a fixed connection, a removable connection, or an integral connection; may be a mechanical connection or an electrical connection; may be a direct connection or an indirect connection through an intermediate medium; or may be intercommunication between two components. Those of ordinary skill in the art may understand specific meanings of the above terms in the present disclosure based on a specific situation.

The above are merely preferred examples of the present disclosure, and are not intended to limit the present disclosure. Any modification, equivalent substitution, and improvement made within the spirit and principle of the present disclosure shall fall within the protection scope of the present disclosure.

What is claimed is:

1. A tire anti-tarnish protective solution prepared from the following components in parts by weight:
    film-forming additive 0.5 to 2
    defoaming agent 0.1 to 0.5
    dispersing agent 2 to 3
    waterborne epoxy resin 15 to 25
    toughening waterborne resin 20 to 35
    modifier 0.5 to 2.5
    active agent 1 to 3.5
    reactive ultraviolet (UV) absorber 1 to 2
    pigment/filler 0 to 6
    bactericide 0.05 to 0.2
    curing additive 0.4 to 1.6
    stabilizer 0.05 to 0.5
    thickener 0.1 to 0.8
    deionized water the balance,
    wherein the above components are in 85 to 150 parts by weight in total;
    the waterborne epoxy resin is a dispersion or of a polymer waterborne epoxy resin comprising hydroxyl;
    the toughening waterborne resin is one or more selected from the group consisting of a natural latex, a waterborne isoprene rubber emulsion, a waterborne butadiene-styrene latex, a waterborne acrylic latex, and a waterborne polyurethane (WPU) latex;
    the modifier is an acylhydrazone compound or an oligomer;
    the active agent is ZnO;
    the reactive UV absorber is a compound carrying a UV-absorbing group; and
    the curing additive is a dispersible isocyanate.

2. The tire anti-tarnish protective solution according to claim 1, wherein the film-forming additive is one or more selected from the group consisting of propylene glycol butyl ether, propylene glycol monomethyl ether acetate (PGMEA), and 2,2,4-trimethyl-1,3-pentanediol monoisobutyrate (TMPD-MIB).

3. The tire anti-tarnish protective solution according to claim 2, wherein the curing additive is a water-dispersible polyisocyanate resin BURNOCK DNW-5500.

4. The tire anti-tarnish protective solution according to claim 1, wherein the waterborne epoxy resin is a one-component epoxy resin emulsion EPICLON H-502-42W.

5. The tire anti-tarnish protective solution according to claim 4, wherein the curing additive is a water-dispersible polyisocyanate resin BURNOCK DNW-5500.

6. The tire anti-tarnish protective solution according to claim 1, wherein the toughening waterborne resin is the WPU latex or a waterborne butadiene-styrene latex SD-7946.

7. The tire anti-tarnish protective solution according to claim 6, wherein the curing additive is a water-dispersible polyisocyanate resin BURNOCK DNW-5500.

8. The tire anti-tarnish protective solution according to claim 1, wherein the modifier is a diacylhydrazone compound.

9. The tire anti-tarnish protective solution according to claim 8, wherein the curing additive is a water-dispersible polyisocyanate resin BURNOCK DNW-5500.

10. The tire anti-tarnish protective solution according to claim 1, wherein the reactive UV absorber is 2[3-(2H-benzotriazol-2-yl)-4-hydroxyphenyl]ethyl 2-methacrylate.

11. The tire anti-tarnish protective solution according to claim 10, wherein the curing additive is a water-dispersible polyisocyanate resin BURNOCK DNW-5500.

12. The tire anti-tarnish protective solution according to claim 1, wherein the curing additive is a water-dispersible polyisocyanate resin BURNOCK DNW-5500.

13. A preparation method of the tire anti-tarnish protective solution according to claim 1, comprising the following steps:
S1: adding the deionized water to a reaction vessel, adding the film-forming additive, the defoaming agent, the dispersing agent, the waterborne epoxy resin, the toughening waterborne resin, the modifier, the active agent, the reactive UV absorber, the pigment/filler, and the bactericide successively, and stirring a resulting emulsion system at a rotational speed of 450 rpm to 650 rpm; and
S2: diluting the curing additive with a specified amount of the deionized water, and under stirring, adding a resulting dilution dropwise to the emulsion system obtained after thorough stirring in S1; and adding the stabilizer and the thickener successively, stirring a resulting mixture for a specified time, and filtering a resulting system to obtain the tire anti-tarnish protective solution.

14. The preparation method of the tire anti-tarnish protective solution according to claim 13, wherein in S2 the specified time is 30 min to 60 min.

* * * * *